United States Patent
Huang et al.

(10) Patent No.: US 12,544,921 B2
(45) Date of Patent: Feb. 10, 2026

(54) ROBOTIC ARM CONTROL METHOD, ROBOTIC ARM AND COMPUTER-READABLE STORAGE MEDIUM

(71) Applicant: UBTECH ROBOTICS CORP LTD, Shenzhen (CN)

(72) Inventors: Liqun Huang, Shenzhen (CN); Xiaoyu Ren, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 188 days.

(21) Appl. No.: 18/383,950

(22) Filed: Oct. 26, 2023

(65) Prior Publication Data
US 2024/0131702 A1 Apr. 25, 2024

Related U.S. Application Data

(63) Continuation of application No. PCT/CN2021/133002, filed on Nov. 25, 2021.

(30) Foreign Application Priority Data

Apr. 26, 2021 (CN) .......................... 202110454863.6

(51) Int. Cl.
*B25J 9/16* (2006.01)
*B25J 13/08* (2006.01)
*B25J 18/00* (2006.01)

(52) U.S. Cl.
CPC ........... *B25J 9/1656* (2013.01); *B25J 9/1679* (2013.01); *B25J 13/085* (2013.01); *B25J 18/00* (2013.01)

(58) Field of Classification Search
CPC ........ B25J 13/085; B25J 9/1692; B25J 19/02; B25J 9/16; B25J 9/1656; B25J 9/1679;
(Continued)

(56) References Cited

U.S. PATENT DOCUMENTS

2020/0238526 A1* 7/2020 Nammoto ................ B25J 9/163

FOREIGN PATENT DOCUMENTS

| CN | 107433590 B | 8/2020 | |
|---|---|---|---|
| CN | 111590564 A | 8/2020 | |
| CN | 112368116 A * | 2/2021 | ......... G05B 19/4155 |

OTHER PUBLICATIONS

On the Calibration of Force & Torque Sensors in Robotics—Bagge Carlson ("Carlson(2019)") (Year: 2019).*
(Continued)

*Primary Examiner* — Bhavesh V Amin
*Assistant Examiner* — Kayla R Doros (57) ABSTRACT

A method for controlling a robotic arm that includes an end effector and a sensor that are mounted at an end of the robotic arm includes: obtaining, by the sensor, n gravity matrix data, wherein the n gravity matrix data are gravity matrix data of the end effector in an end coordinate system when the robotic arm is in a different poses, n≤3; determining n rotation transformation matrices from a base coordinate system of the robotic arm to the end coordinate system when the robotic arm is in n different poses; calculating coordinates of a center of mass and mass of the end effector based on the n gravity matrix data and the a rotation transformation matrices; and controlling the robotic arm based on the coordinates of the center of mass and the mass.

18 Claims, 7 Drawing Sheets

(58) Field of Classification Search
CPC ........ B25J 18/00; B25J 9/1653; B25J 9/1602; B25J 9/1694; G05B 2219/39194; G05B 2219/39529; G05B 2219/40586; G05B 2219/39504; G05B 2219/39482; G05B 2219/39024

See application file for complete search history.

(56) References Cited

OTHER PUBLICATIONS

Machine Learning and System Identification for Estimation in Physical Systems—Bagge Carlson ("Carlson(2018)") (Year: 2018).*
ISR for PCT/CN2021/133002.
Written opinion of ISA for PCT/CN2021/133002.

* cited by examiner

ROBOTIC ARM CONTROL METHOD, ROBOTIC ARM AND COMPUTER-READABLE STORAGE MEDIUM

CROSS REFERENCE TO RELATED APPLICATIONS

The present application is a continuation-application of International Application PCT/CN2021/133002, with an international filing date of Nov. 25, 2021, which claims foreign priority to Chinese Patent Application No. 202110454863.6, filed on Apr. 26, 2021 in the China National Intellectual Property Administration, the contents of all of which are hereby incorporated by reference.

TECHNICAL FIELD

The present disclosure generally relates to robotic arms, and particularly to a method for controlling a robotic arm, robotic arm and computer-readable storage medium.

BACKGROUND

With the development of robotic arms in the field of service robots, robotic arms are usually employed to perform different tasks. For different tasks, different end effectors are mounted at the end of the robotic arm to grab or grip a desired load. For example, a suction cup end effector can be used when grabbing boxes, a multi-finger gripper can be used when grabbing irregular items, and a pen holder can be used when writing. End effectors with different mass will have an impact on the position and force control of the robotic arm.

In some conventional control methods, the mass and center of mass can be obtained through the CAD model of an end effector. However, due to differences in processing, assembly, and electrical components from theory, the actual mass may be different from the mass obtained based on the CAD model, and the CAD model cannot be used for many end effectors to obtain their theoretical model parameters. As a result, the control device of some robotic arms cannot accurately obtain the mass and center of mass of the end effectors, resulting in the control device of the robotic arm being unable to perform precise position movement and force control of the robotic arms.

Therefore, there is a need to provide a robotic arm control method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

When a robotic arm moves, the position and pose of the end effector mounted at the end of the robotic arm will change. Without considering the interference of external forces on the end effector, the end effector is only affected by gravity. Since the direction of the gravity field does not change, the magnitude of gravity remains unchanged in the base coordinate system of the end effector. However, the value of the gravity of the end effector relative to the end coordinate system of the end of the end effector changes with the movement of the end effector. Therefore, the mass attributes of the end effector can be automatically identified based on the characteristics above.

The method of the present disclosure can be applied in any configuration of robotic arm. After a new end effector is mounted at the end of the robotic arm, the method for automatic identification of end effector parameters disclosed in the present disclosure is used to initialize the robotic arm. Only the relevant information corresponding to three random poses needs to be collected to calculate the coordinates of the center of mass and mass of the end effector, which not only requires a small amount of calculation, but also can realize online data processing. There is no need to solve and modify the model parameters offline, and the relevant parameter information of the operator can be updated in real time. Moreover, the method for automatic identification of end effector parameters disclosed in the present disclosure fully considers the power-on error of the force sensor when calculating the coordinates of the center of mass and mass of the end effector, so that the calculated coordinates of the center of mass and mass of the end effector are closer to the true values.

Figure 1:
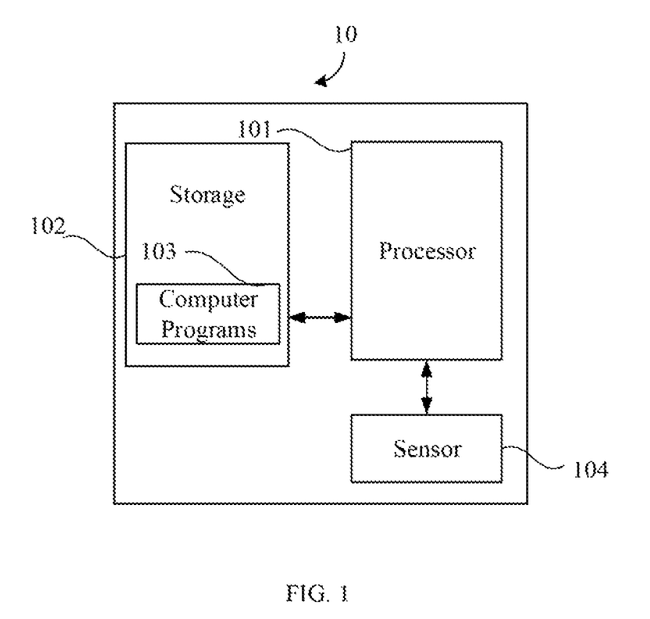
FIG. 1 is a schematic block diagram of a robotic arm according to one embodiment.

FIG. 1 shows a schematic block diagram of a robotic arm 10 according to one embodiment. The robotic arm 10 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage

Figure 6:
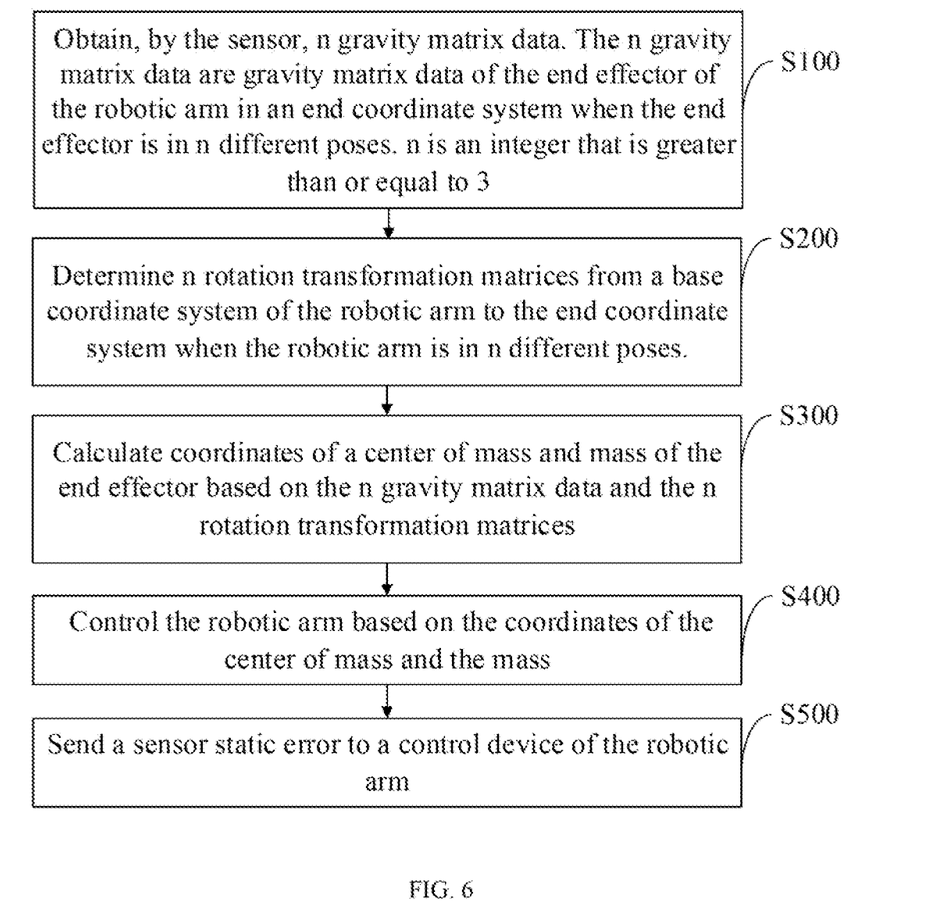
FIG. 6 is an exemplary flowchart of a robotic arm control method according to one embodiment.

102. When the processor 101 executes the computer programs 103, the steps in the embodiments of the method for controlling the robotic arm 10, such as steps S100 to S400 in FIG. 2, steps S110 to S120 in FIG. 3, steps S210 to S240 in FIG. 4, and steps S100 to S500 in FIG. 6, are implemented.

The processor 101 may be an integrated circuit chip with signal processing capability. The processor 101 may be a central processing unit (CPU), a general-purpose processor, a digital signal processor (DSP), art application specific integrated circuit (ASIC), a field-programmable state array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robotic arm, such as a hard disk or a memory. The storage 102 may also be an external storage device of the robotic arm, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robotic arm. The storage 102 can also be used to temporarily store data that have been output or is about to be output.

Figure 7:
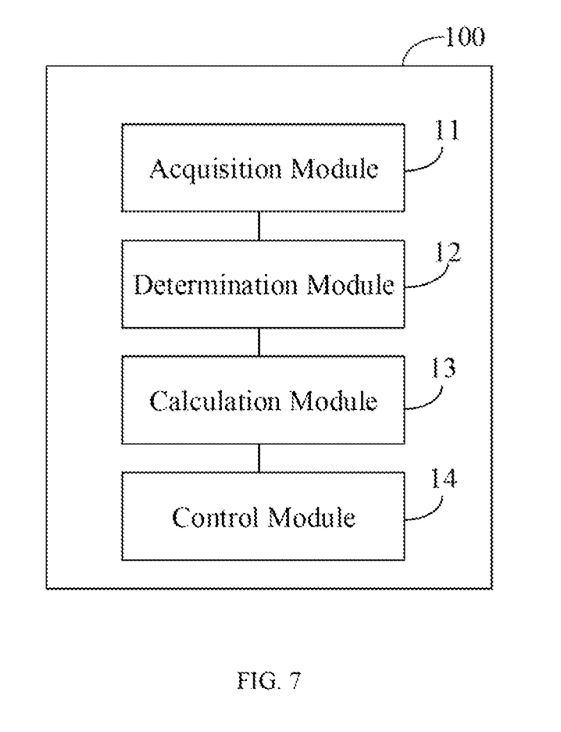
FIG. 7 is a schematic block diagram of a control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robotic arm. For example, the one or more computer programs 103 may be divided into an acquisition module 11, a determination module 12, a calculation module 13 and a control module 14 as shown in FIG. 7.

It should be noted that the block diagram shown in FIG. 1 is only an example of the robotic arm. The robotic arm may include more or fewer components than what is shown in FIG. 1, or have a different configuration than what is shown in FIG. 1. Each component shown in FIG. 1 may be implemented in hardware, software, or a combination thereof. In one embodiment, the robotic arm further includes a sensor 104 electrically connected to the processor 101. The sensor 104 is arranged at the end of the robotic arm 10. In one embodiment, the sensor 104 is a six-dimensional force sensor. The sensor 104 is a force sensor that can simultaneously measure multi-dimensional force/torque and convert the multi-dimensional force/torque into electrical signals. It can be used to monitor forces and torques that change in direction and magnitude. It can measure acceleration or inertia threes and detect the magnitude and point of action of contact forces. It can be understood that the six-dimensional force sensor can measure farce and torque along and around the X-axis, Y-axis, and Z-axis of a coordinate system.

Figure 2:
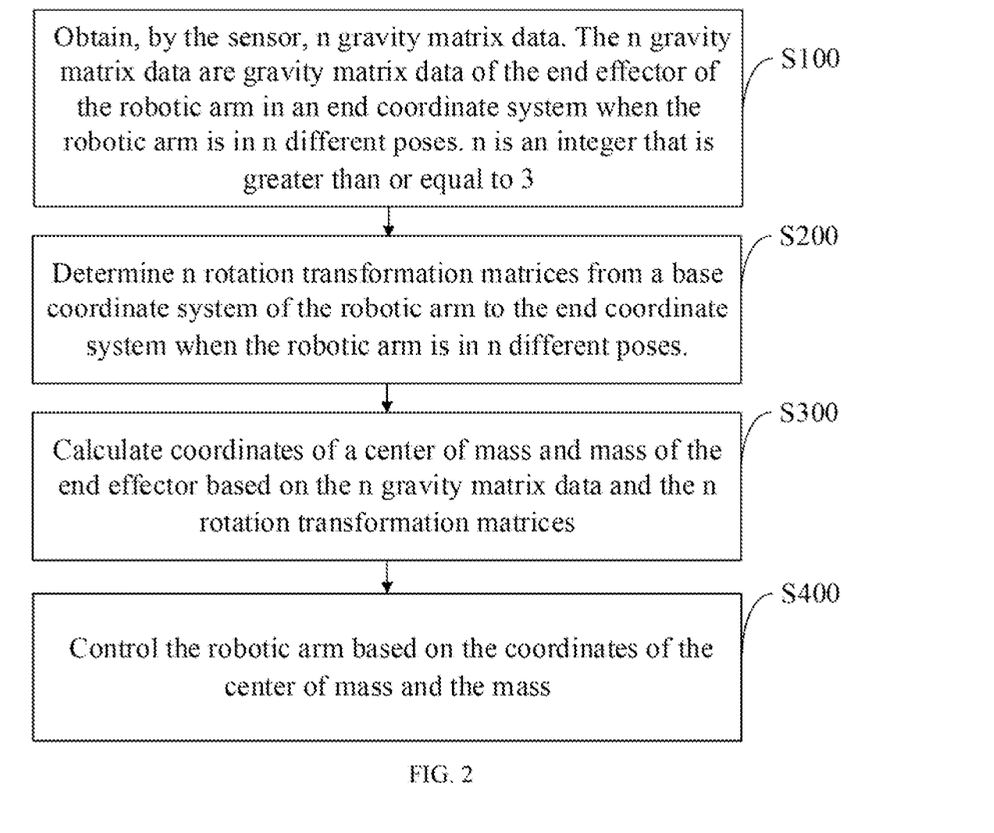
FIG. 2 is an exemplary flowchart of a robotic arm control method according to one embodiment.

Referring to FIG. 2, in one embodiment, a method for controlling the robotic arm 10 may include the following steps.

Step S100: Obtain, by the sensor 104, n gravity matrix data. The n gravity matrix data are gravity matrix data of the end effector 105 (see FIG. 5) of the robotic arm 10 in an end coordinate system when the robotic arm is in n different poses. In one embodiment, n is an integer that is greater than or equal to 3.

Since the contact between the robotic arm and the working surface is often an unknown complex curved surface, when determining the gravity of the end effector at the end of the robotic arm in the end coordinate system, it needs to use the six-dimensional force sensor to obtain n gravity matrix data of the end effector at the end of the robotic arm in the end coordinate system when the robotic arm is in n different poses.

Figure 3:
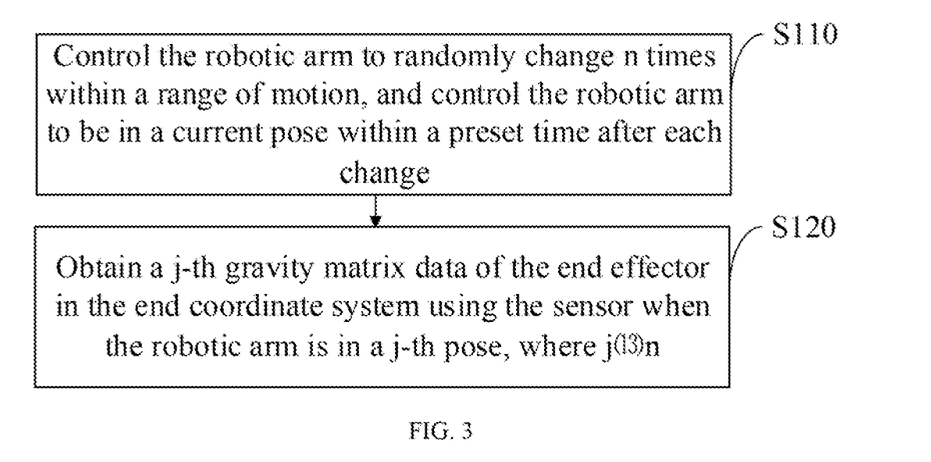
FIG. 3 is an exemplary flowchart of method for determining gravity matrix data according to one embodiment.

Referring to FIG. 3, in one embodiment, determining the n gravity matrix data may include the following steps.

Step S110: Control the robotic arm to randomly change n times within a range of motion, and control the robotic arm to be in a current pose within a preset time after each change.

Here, the robotic arm can be controlled to change its pose n times within the range of motion. In one embodiment, the robotic arm can be controlled in different manners to change its pose n times.

In one embodiment, n end positions can be set in advance within the range of motion of the robotic arm. The end of the robotic arm can be controlled to move to the preset n end positions in sequence, and the end of the robotic arm can be controlled to stay at each end position for a preset time, wherein the preset n end positions are within the range of motion.

In another embodiment, n end positions can be randomly selected within the range of motion of the robotic arm using a random function. The end of the robotic arm can then be controlled to move to the n end positions in sequence, and can be controlled to stay at each end position for the preset time.

In another embodiment, each link (see FIG. 5) of the robotic arm can be controlled to randomly change its pose n times within the range of motion while keeping the end position of the robotic arm unchanged, and the robotic arm can be controlled to stay in a current pose for a preset time after each change.

In one embodiment, the preset time for maintaining the current pose can range from 1 s to 2 s. The standard for setting the preset time is: it should be ensured that the sensor mounted at the end of the robotic arm can obtain stable gravity matrix data within the preset time. Preferably, the preset time can be 1 second, which ensures that the sensor mounted at the end of the robotic arm can obtain stable gravity matrix data within the preset time, and avoids the entire automatic parameter identification process from taking a long time.

Step S120: Obtain a j-th gravity matrix data of the end effector in the end coordinate system using the sensor when the robotic arm is in a j-th pose, where j≤n.

When the robotic arm is in each pose, the six-dimensional force sensor mounted at the end of the robotic arm can obtain the corresponding gravity matrix data of the end effector in the end coordinate system.

Without considering the interference of external forces on the end effector, the end effector is only affected by gravity. Since the direction of the gravity field does not change, the magnitude of gravity remains unchanged in the base coordinate system of the end effector. However, the value of the gravity of the end effector relative to the end coordinate system of the end of the end effector changes with the movement of the end effector. Therefore, the multiple gravity matrix data obtained can be used to identify the mass attributes of the end effector.

Step S200: Determine n rotation transformation matrices from a base coordinate system of the robotic arm to the end coordinate system when the robotic arm is in n different poses.

The rotation transformation matrix determination method can be used to determine n rotation transformation matrices from the base coordinate system of the robot arm to the end coordinate system when the robot arm is in n different poses. The rotation transformation matrix determination method includes at least one of the standard Denavit-Hartenberg (DH) method, the improved DH method, and the Sheth and Uicker (S-U) method. In one embodiment, the DH method can be used to model the robotic arm. When the robotic arm is in different poses, the joint angle of each link of the robotic arm in different poses can be obtained. Then, the rotation transformation matrices can be determined through the joint angle of each link of the robotic arm and the preset twist degrees and offsets of the links. The twist degree of each link and the offset of each link are related to the configuration of the robotic arm. When the configuration of the robotic arm is determined, the twist degree of each link and the offset of each link corresponding to the configuration of the robotic arm can be determined, and the twist degree of each link and the offset of each link are used as preset values.

Figure 4:
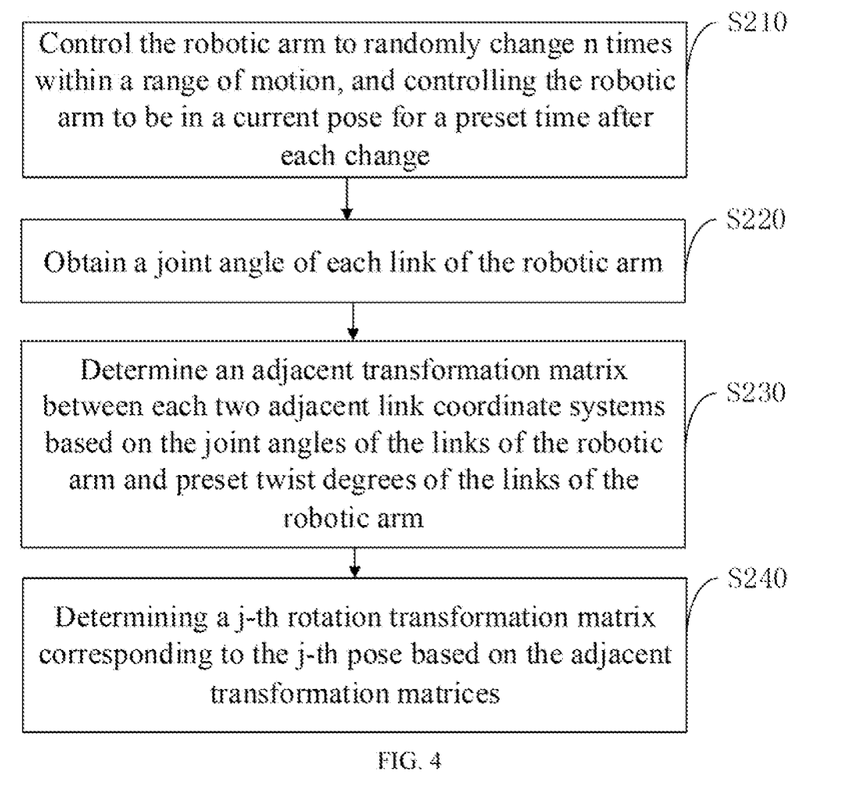
FIG. 4 is an exemplary flowchart of method for determining rotation transformation matrices according to one embodiment.

Referring to FIG. 4, in one embodiment, the n rotation transformation matrices can be determined according to the following steps.

Step S210: Control the robotic arm to randomly change n times within a range of motion, and controlling the robotic arm to be in a current pose for a preset time after each change.

As discussed above, in one embodiment, n end positions can be set in advance within the range of motion of the robotic arm. The end of the robotic arm can be controlled to move to the preset n end positions in sequence, and the end of the robotic arm can be controlled to stay at each end position for a preset time, wherein the preset n end positions are within the range of motion. In another embodiment, n end positions can be randomly selected within the range of motion of the robotic arm using a random function. The end of the robotic arm can then be controlled to move to the n end positions in sequence, and can be controlled to stay at each end position for the preset time. In another embodiment, each link (see FIG. 5) of the robotic arm can be controlled to randomly change its pose n times within the range of motion while keeping the end position of the robotic arm unchanged, and the robotic arm can be controlled to stay in a current pose for a preset time after each change.

As discussed above, in one embodiment, the preset time for maintaining the current pose can range from 1 s to 2 s. The standard for setting the preset time is: it should be ensured that the sensor mounted at the end of the robotic arm can obtain stable gravity matrix data within the preset time. Preferably, the preset time can be 1 second, which ensures that the sensor mounted at the end of the robotic arm can obtain stable gravity matrix data within the preset time, and avoids the entire automatic parameter identification process from taking a long time.

When the robotic arm is in a j-th pose where j is less than or equal to n, the following steps S220~S240 are performed until the nth rotation transformation matrix is determined when j=n.

Step S220: Obtain a joint angle of each link of the robotic arm.

An angular displacement sensor or position encoder at the corresponding position of each joint of the robotic arm can be used to measure the joint angle of the corresponding joint.

Step S230: Determine an adjacent transformation matrix between each two adjacent link coordinate systems based on the joint angles of the links of the robotic arm and preset twist degrees of the links of the robotic arm.

Step S240: Determining a j-th rotation transformation matrix corresponding to the j-th pose based on the adjacent transformation matrices.

In one embodiment, the DH method can be used to model the robotic arm. When the robotic arm is in different poses, the joint angle $q_i$ of the i-th link of the robotic arm can be obtained through a position encoder or an angular displacement sensor of each joint of the robotic arm. The homogeneous transformation matrix $T_i^{i-1}$ of two adjacent coordinate systems can be calculated based on the joint angle $q_i$ of the i-th link, a preset twist degree $\alpha_i$ of the i-th link, and the link offset $d_i$ of the i-th link The homogeneous transformation matrix is expressed as follows:

$$T_i^{i-1} = \begin{bmatrix} \cos q_i & -\sin q_i \cos \alpha_i & \sin q_i \sin \alpha_i & \alpha_i \cos q_i \\ \sin q_i & \cos q_i \cos \alpha_i & -\cos q_i \sin \alpha_i & \alpha_i \sin q_i \\ 0 & \sin \alpha_i & \cos \alpha_i & d_i \\ 0 & 0 & 0 & 1 \end{bmatrix}$$

Figure 5:
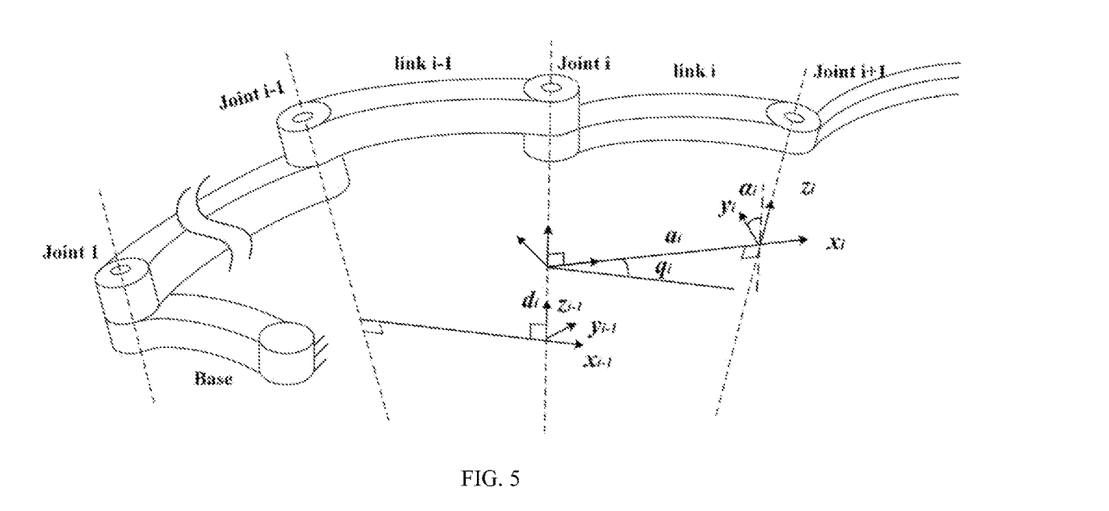
FIG. 5 is a schematic diagram of the robotic arm.

The robotic arm may include multiple links and multiple link joints. In FIG. 5, "Link i−1" represents the i−1th link and "Link i" represents the i-th link. "Joint 1" represents the first link joint, "Joint i−1" represents the i−1th link joint, "Joint i" represents the ith link joint, and "Joint i+1" represents the i+1th link joint. $q_i$ represents the ith joint angle of the i-th link, $\alpha_i$ represents the preset twist degree of the i-th link, and $d_i$ represents the link offset of the i-th link.

In one embodiment, the first three rows of the homogeneous transformation matrix $T_i^{i-1}$ can represent the adjacent transformation matrix $R_i^{-1}$. The adjacent transformation matrix can be expressed as follows:

$$R_i^{i-1} = \begin{bmatrix} \cos q_i & -\sin q_i \cos \alpha_i & \sin q_i \sin \alpha_i \\ \sin q_i & \cos q_i \cos \alpha_i & -\cos q_i \sin \alpha_i \\ 0 & \sin \alpha_i & \cos \alpha_i \end{bmatrix}.$$

where the adjacent transformation matrix represents the coordinate system corresponding to the ith link between the coordinate system corresponding to the i-th link and the coordinate system corresponding to the i−1th link.

After the adjacent transformation matrix between each two adjacent links are determined, the rotation transformation matrix $R_j$ from the base coordinate system to the end coordinate system of the robotic arm corresponding to the j-th pose can be determined according to $R_j = R_1^0 R_2^1 \ldots R_L^{L-1}$, where L is the total number of the links.

Step S300: Calculate coordinates of a center of mass and mass of the end effector based on the n gravity matrix data and the n rotation transformation matrices.

The coordinates of the center of mass and mass of the end effector can be calculated using the n gravity matrix data and the n rotation transformation matrices.

Step S400: Control the robotic arm based on the coordinates of the center of mass and the mass.

In one embodiment, the coordinates of the center of mass and the mass are sent to the control device of the robotic arm, so that the control device of the robotic arm controls the robotic arm according to the coordinates of the center of mass and the mass.

It can be understood that the above-mentioned steps S100 and step S200 can be executed simultaneously or in sequence. When executed in sequence, there is no order of execution between step S100 and step S200. However, when they are executed sequentially, it should be ensured that the j-th rotation transformation matrix and the j-th gravity matrix data corresponding to the j-th pose are the same. Preferably, step S100 and step S200 are executed simultaneously, and in the j-th pose, the j-th rotation transformation matrix and the j-th gravity matrix data are determined simultaneously. Executing step S100 and step S200 simultaneously can speed up the recognition speed of the coordinates of the center of mass and mass of the end effector.

By performing the method discussed above, n gravity matrix data and a rotation transformation matrices corresponding to the robotic arm in n different poses can be obtained and the coordinates of the center of mass and mass of the end effector can be calculated based on them. The method not only requires a small amount of calculation, but also can realize online data processing and determine the coordinates of the center of mass and mass of the end effector. There is no need to solve and modify the model parameters offline, which can effectively improve the speed of determining parameters related to the end effector. In addition, by sending the coordinates of the center of mass and the mass of the end effector to the control device of the robotic arm, the control device can control the robotic arm according to the coordinates of the center of mass and the mass of the end effector.

In one embodiment, the coordinates center of mass and mass of the end effector can be determined according to the following equation:

$$\begin{bmatrix} m \\ mr_c \\ f_{FTbias} \\ \tau_{FTbias} \end{bmatrix} = \begin{bmatrix} Y_1 \\ Y_2 \\ Y_3 \end{bmatrix}^{\#} \begin{bmatrix} W_1 \\ W_2 \\ W_3 \end{bmatrix}, \text{ where } Y_j =$$

$$\begin{bmatrix} R_j^T g & 0_{3\times 3} & I_{3\times 3} & 0_{3\times 3} \\ 0_{1\times 3} & -S(R_j^T g) & 0_{3\times 3} & I_{3\times 3} \end{bmatrix}, W_j = \begin{bmatrix} f_{FTj} \\ \tau_{FTj} \end{bmatrix}.$$

j=1, 2 or 3, m represents the mass of the end effector, $r_c$ represents the coordinates of the center of mass of the end effector, $f_{FTbias}$ represents a static error of a force measured by the sensor, $\tau_{FTbias}$ represents a static error of a torque measured by the sensor, $Y_j$ represents a parameter matrix corresponding to a j-th pose, $R_j^T g$ represents a transpose matrix corresponding to a j-th rotation transformation matrix, and g represents a gravity acceleration vector, $S(R_j^T g)$ represents finding an antisymmetric matrix of $R_j^T g$, $0_{1\times 3}$ represents a zero matrix of 1 row and 3 columns, $I_{3\times 3}$ represents an identity matrix of 3 rows and 3 columns, $0_{3\times 3}$ represents a zero matrix of 3 rows and 3 columns, $W_j$ represents gravity matrix data corresponding to the j-th pose, $f_{FTj}$ represents a force vector of the gravity matrix data corresponding to the j-th pose, and $\tau_{FTj}$ represents a torque vector of the gravity matrix data corresponding to the j-th pose.

Every time the six-dimensional force sensor is powered on, there is a static error in the measured values obtained by the six-dimensional force sensor, and the static error is different every time. Generally, it is necessary to let the six-dimensional force sensor rest for a period of time before use, and then measure the static error of the six-dimensional force sensor before putting it into use. However, it needs to remove the six-dimensional force sensor and the end effector every time, which is very time-consuming and inconvenient. If the six-dimensional force and the end effector are not removed for error measurement, the static error will be affected by the end effector, resulting in a larger error in measurement results of the six-dimensional force. The equation disclosed in the present disclosure for determining the coordinates of the center of mass and mass of the end effector takes into account the influence of the static error of the six-dimensional force sensor after each power-on. Here, $f_{FTbias}$ represents the static error of the force obtained by the sensor at the end of the robotic arm, and $\tau_{FTbias}$ represents the static error of the torque obtained by the sensor at the end of the robotic arm.

$\Sigma_{base}$ represents the base coordinate system of the end effector, $\Sigma_{FT}$ represents the end coordinate system of the six-dimensional force sensor mounted at the end of the robotic arm, and $\Sigma_{load}$ represents the coordinate system located at the center of mass of the end effector. At any moment, the magnitude of gravity on the center of mass of the end effector remains unchanged in the base coordinate system, which can be expressed as $$W_{load}^{base} = \begin{bmatrix} mg \\ 0_{3\times 1} \end{bmatrix},$$

$W_{load}^{base} \in R^6$, where in is the mass of the end effector and $g \in R^3$ is the gravitational acceleration.

The force of gravity on the end effector measured by the six-dimensional force sensor mounted at the end of the robotic arm will be affected by the movement of the robotic arm, and the measured value includes the static error after the six-dimensional force sensor is powered on. Therefore, the gravity matrix data measured by the six-dimensional force sensor can be expressed as $$W_{meas}^{FT} = \begin{bmatrix} f_{meas}^{FT} \\ \tau_{meas}^{FT} \end{bmatrix} \in R^6.$$

In addition, $W_{meas}^{FT} = W_{load}^{FT} + W_{bias}^{FT}$, $W_{load}^{FT} \in R^6$ is the value of the force of gravity on the end effector in the end coordinate system where the six-dimensional force sensor is located, and $$W_{bias}^{FT} = \begin{bmatrix} f_{bias}^{FT} \\ \tau_{bias}^{FT} \end{bmatrix} \in R^6$$

is the static error of the six-dimensional force sensor. and $W_{load}^{base}$ and $W_{load}^{FT}$ are just the expressions of the force of gravity on the center of mass of the end effector in different coordinate systems. Therefore, the conversion relationship between $W_{load}^{base}$ and $W_{load}^{FT}$ can be obtained based on the configuration and coordinate conversion of the robotic arm. $r_c=[r_{cx}, r_{cy}, r_{cz}]$ are the coordinates of the center of mass of the end effector. S is the antisymmetric matrix for calculating the $r_c$ vector, $R_{base}^{FT}$ is the rotation transformation matrix from the base coordinate system to the six-dimensional force sensor.

$$W_{load}^{FT} = \begin{bmatrix} I_{3\times3} & 0_{3\times3} \\ S(r_c) & I_{3\times3} \end{bmatrix} \begin{bmatrix} R_{base}^{FT} & 0_{3\times3} \\ 0_{3\times3} & R_{base}^{FT} \end{bmatrix} W_{load}^{base},$$

$R_{base}^{FT} = (R_{FT}^{base})^T$, and $R_{FT}^{base} = R_1^{base} R_2^{1} \ldots R_n^{n-1} R_{FT}^{n}$ that is product of the successive multiplication of the adjacent transformation matrices from the base of the robotic arm to the six-dimensional force sensor.

Based on the mass, coordinates of the center of mass, and sensor static error obtained according to the equations above, the following equations can be obtained:

$$\begin{bmatrix} f_{meas}^{FT} \\ \tau_{meas}^{FT} \end{bmatrix} = \begin{bmatrix} R_{base}^{FT}g & 0_{3\times3} & I_{3\times3} & 0_{3\times3} \\ 0_{3\times3} & -S(R_{base}^{FT}g) & 0_{3\times3} & I_{3\times3} \end{bmatrix} \begin{bmatrix} m \\ r_c \\ f_{bias}^{FT} \\ \tau_{bias}^{FT} \end{bmatrix}$$

$$W_{meas}^{FT} = Y_{meas}^{FT} \pi_{meas}^{FT}.$$

There are a total of 10 parameters $\pi_{meas}^{FT}$ that need to be identified, and $Y_{meas}^{FT}$ is a 6*10 matrix. The required parameters cannot be obtained with only one data point. Therefore, the Y matrix is discriminated to find the minimum number of pieces of information of the robotic arm that needs to be measured. Assuming that information from n points is needed, the combination of the six-dimensional force information and the identification matrix of n points is as follows:

$$\begin{bmatrix} W_1 \\ \ldots \\ W_n \end{bmatrix} = \begin{bmatrix} Y_1 \\ \ldots \\ Y_n \end{bmatrix} \pi_{meas}^{FT} = Y \pi_{meas}^{FT}.$$

To solve the problem, the row rank of the Y matrix should be greater than the number of identification parameters, that is, rank (Y)≥10. Through analysis, it can be seen that when n=1 rank(Y)=5, when m=2, rank(Y)=9, when n≥3, rank(Y) =10. Therefore, for a robotic arm with any number of joints, at least three different end effector poses are needed to calculate the parameters of the end effector and the static error of the six-dimensional force sensor. In addition, there is no need to solve it step by step. As long as the three gravity matrix data and three rotation transformation matrix data corresponding to the three poses are collected, the coordinates of the center of mass and mass of the end effector can be solved.

Referring to FIG. 6, in one embodiment, the method may further include the following steps.

Step S500: Send a sensor static error to a control device of the robotic arm.

The static error of the sensor mounted at the end of the robotic arm can be sent to the control device of the robotic arm such that the control device can compensate for force of gravity and static errors based on the coordinates of the center of mass and mass of the end effector and the static error of the sensor at the end of the robotic arm. Thus, accurate control instructions can be issued, thereby improving control accuracy, and improving the dynamic and steady-state performance of the robotic arm.

Referring to FIG. 7, in one embodiment, a control device 100 for a robotic arm may include an acquisition module 11, a determination module 12, a calculation module 13 and a control module 14.

The acquisition module 11 is to obtain, by the sensor of the robotic arm, n gravity matrix data. The n gravity matrix data are gravity matrix data of the end effector in an end coordinate system when the robotic arm is in n different poses and n is an integer greater than or equal to 3. The determination module 12 is to determine n rotation transformation matrices from a base coordinate system of the robotic arm to the end coordinate system when the robotic arm is in n different poses. The calculation module 13 is to calculate coordinates of a center of mass and mass of the end effector based on the n gravity matrix data and the n rotation transformation matrices. The control module 14 is to control the robotic arm based on the coordinates of the center of mass and the mass.

In one embodiment, obtaining the n gravity matrix data may include: controlling the robotic arm to randomly change n times within a range of motion, and controlling the robotic arm to be in a current pose for a preset time after each change; and obtaining a j-th gravity matrix data of the end effector in the end coordinate system using the sensor when the robotic arm is in a j-th pose, where j≤n.

In one embodiment, determining the n rotation transformation matrices from the base coordinate system of the robotic arm to the end coordinate system when the robotic arm is in the n different poses may include: controlling the robotic arm to randomly change n times within a range of motion, and controlling the robotic arm to be in a current pose for a preset time after each change; and when the robotic arm is in a j-th pose: obtaining a joint angle of each link of the robotic arm; determining an adjacent transformation matrix between each two adjacent link coordinate systems; and determining a j-th rotation transformation matrix corresponding to the j-th pose based on the adjacent transformation matrices. Here, j is less than or equal to n.

In one embodiment, the center of mass and the mass are determined according to the following equations:

$$\begin{bmatrix} m \\ mr_c \\ f_{FTbias} \\ \tau_{FTbias} \end{bmatrix} = \begin{bmatrix} Y_1 \\ Y_2 \\ Y_3 \end{bmatrix}^{\#} \begin{bmatrix} W_1 \\ W_2 \\ W_3 \end{bmatrix};$$

$$Y_j = \begin{bmatrix} R_j^T g & 0_{3\times3} & I_{3\times3} & 0_{3\times3} \\ 0_{1\times3} & -S(R_j^T g) & 0_{3\times3} & I_{3\times3} \end{bmatrix};$$

$$W_j = \begin{bmatrix} f_{FTj} \\ \tau_{FTj} \end{bmatrix};$$

where j=1, 2 or 3, in represents the mass of the end effector, $r_c$ represents the coordinates of the center of mass of the end effector, $f_{FTbias}$ represents a static error of a force measured by the sensor, $\tau_{FTbias}$ represents a static error of a torque measured by the sensor, $Y_j$ represents a parameter matrix corresponding to a j-th pose, $R_j^T g$ represents a transpose matrix corresponding to a j-th rotation transformation matrix, and g represents a gravity acceleration vector, $S(R_j^T g)$ represents finding an antisymmetric matrix of $R_j^T g$, $0_{1\times3}$ represents a zero matrix of 1 row and 3 columns, $I_{3\times3}$ represents an identity matrix of 3 rows and 3 columns, $0_{3\times3}$ represents a zero matrix of 3 rows and 3 columns, $W_j$ represents gravity matrix data corresponding to the j-th pose, $f_{FTj}$ represents a force vector of the gravity matrix data corresponding to the j-th pose, and $\tau_{FTj}$ represents a torque vector of the gravity matrix data corresponding to the j-th pose.

In one embodiment, controlling the robotic arm to randomly change n times within the range of motion, and controlling the robotic arm to be in the current pose for a preset time after each change may include: controlling the end of the robotic arm to move to preset n end positions in sequence, and controlling the end of the robotic arm to be at each end position for the preset time, wherein the preset n end positions are within the range of motion; or randomly selecting n end positions within the range of motion using a random function, controlling the end of the robotic arm to move to the n end positions in sequence, and controlling the end of the robotic arm to be at each end position for the preset time; or controlling each link of the robotic arm to randomly change n times within the range of motion while keeping the end position of the robotic arm unchanged, and controlling the robotic arm to be in the current pose for the preset time after each change.

In one embodiment, the preset time is in a range of 1 to 2 seconds.

It should be noted that the basic principles and technical effects of the robot control device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fleet, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person haying ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may dearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the an may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable tiles, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for controlling a robotic arm that comprises an end effector and a sensor that are mounted at an end of the robotic arm, the method comprising:
   obtaining, by the sensor, n gravity matrix data, wherein the n gravity matrix data are gravity matrix data of the end effector in an end coordinate system when the robotic arm is in n different poses, $n \geq 3$;
   determining n rotation transformation matrices from a base coordinate system of the robotic arm to the end coordinate system when the robotic arm is in n different poses;
   calculating coordinates of a center of mass and mass of the end effector based on the n gravity matrix data and the n rotation transformation matrices; and
   controlling the robotic arm based on the coordinates of the center of mass and the mass;
   wherein obtaining the n gravity matrix data comprises:
   controlling the robotic arm to randomly change n times within a range of motion, and controlling the robotic arm to be in a current pose for a preset time after each change; and
   obtaining a j-th gravity matrix data of the end effector in the end coordinate system using the sensor when the robotic arm is in a j-th pose, where $j \leq n$.

2. The method of claim 1, wherein determining the n rotation transformation matrices from the base coordinate system of the robotic arm to the end coordinate system when the robotic arm is in the n different poses comprises:
   controlling the robotic arm to randomly change n times within a range of motion, and controlling the robotic arm to be in a current pose for a preset time after each change; and
   when the robotic arm is in a j-th pose:
   obtaining a joint angle of each link of the robotic arm;
   determining an adjacent transformation matrix between each two adjacent link coordinate systems based on the joint angles of the links of the robotic arm and preset twist degrees of the links of the robotic arm; and
   determining a j-th rotation transformation matrix corresponding to the j-th pose based on the adjacent transformation matrices;
   wherein j is less than or equal to n.

3. The method of claim 1, wherein the center of mass and the mass are determined according to the following equations:

$$\begin{bmatrix} m \\ mr_c \\ f_{FTbias} \\ \tau_{FTbias} \end{bmatrix} = \begin{bmatrix} Y_1 \\ Y_2 \\ Y_3 \end{bmatrix}^{\#} \begin{bmatrix} W_1 \\ W_2 \\ W_3 \end{bmatrix};$$

$$Y_j = \begin{bmatrix} R_j^T g & 0_{3\times 3} & I_{3\times 3} & 0_{3\times 3} \\ 0_{1\times 3} & -S(R_j^T g) & 0_{3\times 3} & I_{3\times 3} \end{bmatrix};$$

-continued $$W_j = \begin{bmatrix} f_{FTj} \\ \tau_{FTj} \end{bmatrix};$$

where j=1, 2 or 3, m represents the mass of the end effector, $r_c$ represents the coordinates of the center of mass of the end effector, $f_{FTbias}$ represents a static error of a force measured by the sensor, $\tau_{FTbias}$ represents a static error of a torque measured by the sensor, $Y_j$ represents a parameter matrix corresponding to a j-th pose, $R_j^T g$ represents a transpose matrix corresponding to a j-th rotation transformation matrix, and g represents a gravity acceleration vector, $S(R_j^T g)$ represents finding an antisymmetric matrix of $R_j^T g$, $0_{1\times 3}$ represents a zero matrix of 1 row and 3 columns, $I_{3\times 3}$ represents an identity matrix of 3 rows and 3 columns, $0_{3\times 3}$ represents a zero matrix of 3 rows and 3 columns, $W_j$ represents gravity matrix data corresponding to the j-th pose, $f_{FTj}$ represents a force vector of the gravity matrix data corresponding to the j-th pose, and $\tau_{FTj}$ represents a torque vector of the gravity matrix data corresponding to the j-th pose.

4. The method of claim 1, wherein controlling the robotic arm to randomly change n times within the range of motion, and controlling the robotic arm to be in the current pose for a preset time after each change comprise:
   controlling the end of the robotic arm to move to preset n end positions in sequence, and controlling the end of the robotic arm to be at each end position for the preset time, wherein the preset n end positions are within the range of motion; or
   randomly selecting n end positions within the range of motion using a random function, controlling the end of the robotic arm to move to the n end positions in sequence, and controlling the end of the robotic arm to be at each end position for the preset time; or
   controlling each link of the robotic arm to randomly change n times within the range of motion while keeping a position of the end of the robotic arm unchanged, and controlling the robotic arm to be in the current pose for the preset time after each change.

5. The method of claim 1, wherein the preset time is in a range of 1 to 2 seconds.

6. The method of claim 3, further comprising: sending a static error of the sensor to a control device of the robotic arm.

7. A robotic arm comprising:
   one or more processors;
   a sensor and an end effector that are mounted at an end of the robotic arm, the sensor electrically coupled to the one or more processors;
   a memory coupled to the one or more processors, the memory storing programs that, when executed by the one or more processors, cause performance of operations comprising:
   obtaining, by the sensor, n gravity matrix data, wherein the n gravity matrix data are gravity matrix data of the end effector in an end coordinate system when the robotic arm is in n different poses, n≥3;
   determining n rotation transformation matrices from a base coordinate system of the robotic arm to the end coordinate system when the robotic arm is in n different poses;
   calculating coordinates of a center of mass and mass of the end effector based on the n gravity matrix data and the n rotation transformation matrices; and
   controlling the robotic arm based on the coordinates of the center of mass and the mass;
   wherein determining the n rotation transformation matrices from the base coordinate system of the robotic arm to the end coordinate system when the robotic arm is in the n different poses comprises:
   controlling the robotic arm to randomly change n times within a range of motion, and controlling the robotic arm to be in a current pose for a preset time after each change; and
   when the robotic arm is in a j-th pose:
   obtaining a joint angle of each link of the robotic arm;
   determining an adjacent transformation matrix between each two adjacent link coordinate systems based on the joint angles of the links of the robotic arm and preset twist degrees of the links of the robotic arm; and
   determining a j-th rotation transformation matrix corresponding to the j-th pose based on the adjacent transformation matrices;
   wherein j is less than or equal to n.

8. The robotic arm of claim 7, wherein obtaining the n gravity matrix data comprises:
   controlling the robotic arm to randomly change n times within a range of motion, and controlling the robotic arm to be in a current pose for a preset time after each change; and
   obtaining a j-th gravity matrix data of the end effector in the end coordinate system using the sensor when the robotic arm is in a j-th pose, where j≤n.

9. The robotic arm of claim 7, wherein the center of mass and the mass are determined according to the following equations:

$$\begin{bmatrix} m \\ mr_c \\ f_{FTbias} \\ \tau_{FTbias} \end{bmatrix} = \begin{bmatrix} Y_1 \\ Y_2 \\ Y_3 \end{bmatrix}^{\#} \begin{bmatrix} W_1 \\ W_2 \\ W_3 \end{bmatrix};$$

$$Y_j = \begin{bmatrix} R_j^T g & 0_{3\times 3} & I_{3\times 3} & 0_{3\times 3} \\ 0_{1\times 3} & -S(R_j^T g) & 0_{3\times 3} & I_{3\times 3} \end{bmatrix};$$

$$W_j = \begin{bmatrix} f_{FTj} \\ \tau_{FTj} \end{bmatrix};$$

where j=1, 2 or 3, m represents the mass of the end effector, $r_c$ represents the coordinates of the center of mass of the end effector, $f_{FTbias}$ represents a static error of a force measured by the sensor, $\tau_{FTbias}$ represents a static error of a torque measured by the sensor, $Y_j$ represents a parameter matrix corresponding to a j-th pose, $R_j^T g$ represents a transpose matrix corresponding to a j-th rotation transformation matrix, and g represents a gravity acceleration vector, $S(R_j^T g)$ represents finding an antisymmetric matrix of $R_j^T g$, $0_{1\times 3}$ represents a zero matrix of 1 row and 3 columns, $I_{3\times 3}$ represents an identity matrix of 3 rows and 3 columns, $0_{3\times 3}$ represents a zero matrix of 3 rows and 3 columns, $W_j$ represents gravity matrix data corresponding to the j-th pose, $f_{FTj}$ represents a force vector of the gravity matrix data corresponding to the j-th pose, and $\tau_{FTj}$ represents a torque vector of the gravity matrix data corresponding to the j-th pose.

10. The robotic arm of claim 8, wherein controlling the robotic arm to randomly change n times within the range of motion, and controlling the robotic arm to be in the current pose for a preset time after each change comprise:

controlling the end of the robotic arm to move to preset n end positions in sequence, and controlling the end of the robotic arm to be at each end position for the preset time, wherein the preset n end positions are within the range of motion; or randomly selecting n end positions within the range of motion using a random function, controlling the end of the robotic arm to move to the n end positions in sequence, and controlling the end of the robotic arm to be at each end position for the preset time; or controlling each link of the robotic arm to randomly change n times within the range of motion while keeping a position of the end of the robotic arm unchanged, and controlling the robotic arm to be in the current pose for the preset time after each change.

11. The robotic arm of claim 8, wherein the preset time is in a range of 1 to 2 seconds.

12. A non-transitory computer-readable storage medium storing instructions that, when executed by at least one processor of a robotic arm that comprises an end effector and a sensor that are mounted at an end of the robotic arm, cause the at least one processor to perform a method, the method comprising:

obtaining, by the sensor, n gravity matrix data, wherein the n gravity matrix data are gravity matrix data of the end effector in an end coordinate system when the robotic arm is in n different poses, n≤3;

determining n rotation transformation matrices from a base coordinate system of the robotic arm to the end coordinate system when the robotic arm is in n different poses;

calculating coordinates of a center of mass and mass of the end effector based on the n gravity matrix data and the n rotation transformation matrices; and controlling the robotic arm based on the coordinates of the center of mass and the mass;

wherein obtaining the n gravity matrix data comprises:
controlling the robotic arm to randomly change n times within a range of motion, and controlling the robotic arm to be in a current pose for a preset time after each change; and obtaining a j-th gravity matrix data of the end effector in the end coordinate system using the sensor when the robotic arm is in a j-th pose, where j≤n.

13. The non-transitory computer-readable storage medium of claim 12, wherein determining the n rotation transformation matrices from the base coordinate system of the robotic arm to the end coordinate system when the robotic arm is in the n different poses comprises:

controlling the robotic arm to randomly change n times within a range of motion, and controlling the robotic arm to be in a current pose for a preset time after each change; and when the robotic arm is in a j-th pose:
obtaining a joint angle of each link of the robotic arm;
determining an adjacent transformation matrix between each two adjacent link coordinate systems based on the joint angles of the links of the robotic arm and preset twist degrees of the links of the robotic arm; and
determining a j-th rotation transformation matrix corresponding to the j-th pose based on the adjacent transformation matrices;
wherein j is less than or equal to n.

14. The non-transitory computer-readable storage medium of claim 12, wherein the center of mass and the mass are determined according to the following equations:

$$\begin{bmatrix} m \\ mr_c \\ f_{FTbias} \\ \tau_{FTbias} \end{bmatrix} = \begin{bmatrix} Y_1 \\ Y_2 \\ Y_3 \end{bmatrix}^{\#} \begin{bmatrix} W_1 \\ W_2 \\ W_3 \end{bmatrix};$$

$$Y_j = \begin{bmatrix} R_j^T g & 0_{3\times 3} & I_{3\times 3} & 0_{3\times 3} \\ 0_{1\times 3} & -S(R_j^T g) & 0_{3\times 3} & I_{3\times 3} \end{bmatrix};$$

$$W_j = \begin{bmatrix} f_{FTj} \\ \tau_{FTj} \end{bmatrix};$$

where j=1, 2 or 3, m represents the mass of the end effector, $r_c$ represents the coordinates of the center of mass of the end effector, $f_{FTbias}$ represents a static error of a force measured by the sensor, $\tau_{FTbias}$ represents a static error of a torque measured by the sensor, $Y_j$ represents a parameter matrix corresponding to a j-th pose, $R_j^T g$ represents a transpose matrix corresponding to a j-th rotation transformation matrix, and g represents a gravity acceleration vector, $S(R_j^T g)$ represents finding an antisymmetric matrix of $R_j^T g$, $0_{1\times 3}$ represents a zero matrix of 1 row and 3 columns, $I_{3\times 3}$ represents an identity matrix of 3 rows and 3 columns, $0_{3\times 3}$ represents a zero matrix of 3 rows and 3 columns, $W_j$ represents gravity matrix data corresponding to the j-th pose, $f_{FTj}$ represents a force vector of the gravity matrix data corresponding to the j-th pose, and $\tau_{FTj}$ represents a torque vector of the gravity matrix data corresponding to the j-th pose.

15. The non-transitory computer-readable storage medium of claim 12, wherein controlling the robotic arm to randomly change n times within the range of motion, and controlling the robotic arm to be in the current pose for a preset time after each change comprise:

controlling the end of the robotic arm to move to preset n end positions in sequence, and controlling the end of the robotic arm to be at each end position for the preset time, wherein the preset n end positions are within the range of motion; or randomly selecting n end positions within the range of motion using a random function, controlling the end of the robotic arm to move to the n end positions in sequence, and controlling the end of the robotic arm to be at each end position for the preset time; or controlling each link of the robotic arm to randomly change n times within the range of motion while keeping a position of the end of the robotic arm unchanged, and controlling the robotic arm to be in the current pose for the preset time after each change.

16. The non-transitory computer-readable storage medium of claim 12, wherein the preset time is in a range of 1 to 2 seconds.

17. The non-transitory computer-readable storage medium of claim 14, the method further comprises: sending a static error of the sensor to a control device of the robotic arm.

18. The robotic arm of claim 9, the operations further comprise: sending a static error of the sensor to a control device of the robotic arm.

* * * * *